Jan. 27, 1970   H. D. BAUMANN   3,491,599
PRESSURE TRANSMITTER
Filed Feb. 14, 1966
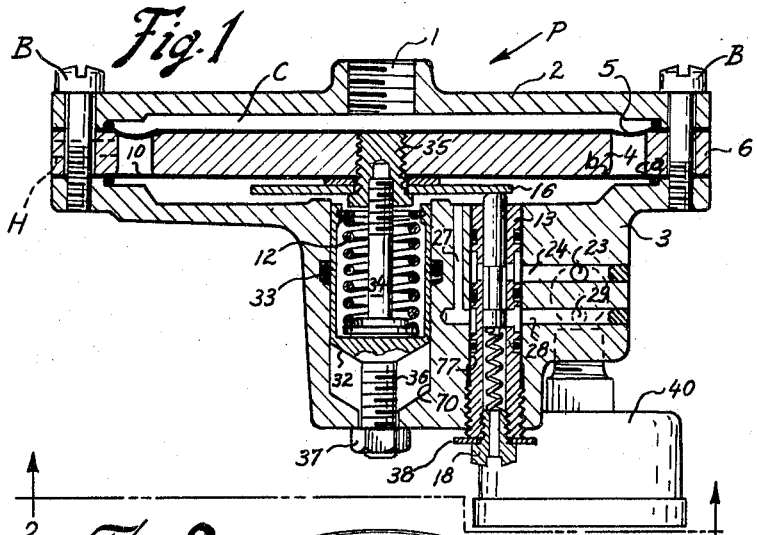
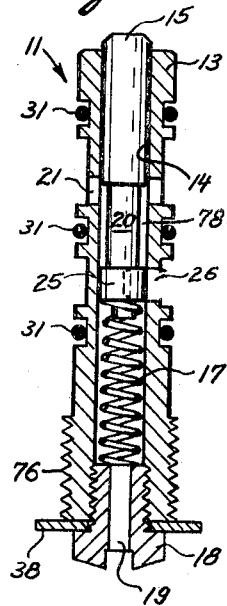
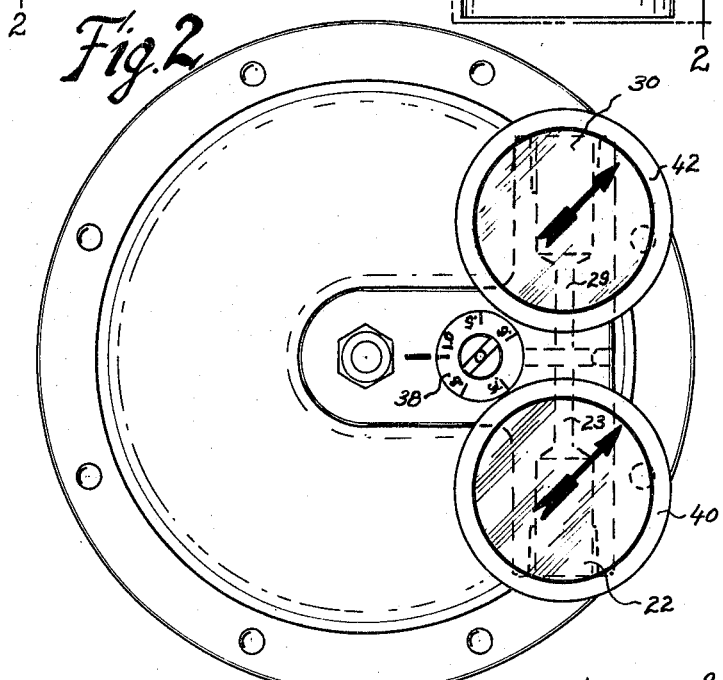
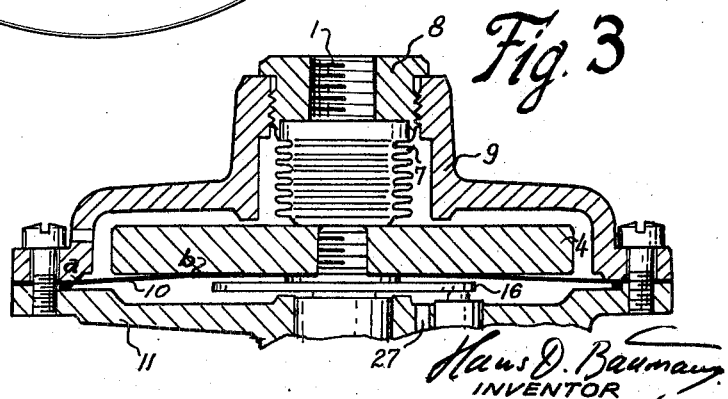
Hans D. Baumann
INVENTOR

United States Patent Office 3,491,599
Patented Jan. 27, 1970

3,491,599
PRESSURE TRANSMITTER
Hans D. Baumann, Decatur, Ill., assignor to Donald H. Abbott, Cincinnati, Ohio
Filed Feb. 14, 1966, Ser. No. 528,019
Int. Cl. G01l 7/08
U.S. Cl. 73—407        6 Claims

ABSTRACT OF THE DISCLOSURE

A pressure transmitter comprising a movable plate in a cavity formed in a housing, with a pair of diaphragms on respective sides thereof subject to pressure variations, a pilot valve mechanism actuatable upon movement of the plate whereby a pneumatic signal developed as a result of line variation is capable of being transmitted to a remote controller or receiver. Mechanical spring means for establishing an initial pneumatic signal when line pressure is zero is included. The pilot valve mechanism is adjustable to respond to more than one range of line pressure valves. A metal bellows may replace the diaphragm exposed to line pressure for higher fluid pressures in the line.

BACKGROUND OF THE INVENTION

Field of the invention

This device is utilized in automatic process control systems in which a transmitting device connected to a line in the system senses pressure variables in the line. A corresponding pneumatic signal is transmitted from the device to a remote controller or receiver commanding a control valve which rectifies the line pressure by varying the fluid flow through the system should an error exist.

The field of art to which the invention is most likely to pertain is generally located in the class of apparatus relating to pressure transmitting devices.

Description of the prior art

Apparatuses, of the type involved here, are likely to be disclosed in Class 137, U.S. Patent Office Classification.

SUMMARY

The invention herein relates to a device for measuring variations in line pressure and transmitting knowledge of such variations by means of a proportionate pneumatic signal to a remote controller or receiver.

An object of this invention is to provide for a novel device.

Another object of this invention is to provide for an efficient, economical and highly sensitive device for practical application in automatic process control systems.

Another object of this invention is to provide for components in a device which are not subject to vibration damage.

Another object of this invention is to exclude levers, bearings, and other delicate parts normally found in instruments of this type and which are subject to vibration damage.

A further object of this invention is to provide for a pressure transmitter employing a minimum number of parts for economy of production and simplicity of adjustment and which nevertheless is highly sensitive and efficient.

Pressure transmitters of present-day design employ a so-called flapper-nozzle arrangement, the performance of which depends upon careful metering of filtered and dry air only through a very fine orifice. My device, on the other hand, utilizes a normally closed 3-way valve whose flow area is self-adjusting to compensate for variation in the air make-up. Instead of manipulating levers and using fulcrum points to vary the span or ratio between pressure and signal variations, my invention offers means for changing the effective working area of a feed-back diaphragm in a stepless fashion to achieve the same results.

These and other objects and advantages will become more apparent by a full reading of the following description, appended claims thereto, and the accompanying drawing comprising one sheet.

Description of the drawing

FIG. 1 is a cross-sectional view of a device embodying the invention.

FIG. 2 is a view taken on line 2—2 of FIG. 1.

FIG. 3 is a fragmentary cross-sectional view of a modified embodiment of the invention.

FIG. 4 is an enlarged cross-sectional view of a pilot valve mechanism of the embodiment shown in FIG. 1.

DESCRIPTION OF THE PREFERRED EMBODIMENT

Referring now to the drawing in which reference characters refer to like numerals in the following description, 3 designates generally a housing for my pressure transmitter P as shown in FIG. 1. Housing 3 includes an upper flanged cap member 2 having a port 1 centrally disposed thereof for admission of fluid pressure in a system, the value of which is being measured, and a spacer ring 6 interposed between flanged cap member 2 and the main body of housing 3. A plurality of bolts B secure tightly together such elements to form an airtight cavity C. A breather hole H is provided in spacer ring 6 as shown in FIG. 1.

A plate 4 is movably disposed in cavity C clear of spacer ring 6. Plate 4 is secured to a screw 35 centrally disposed therein and to which in turn a post 34 is threaded. Post 34 extends into a tubular shell 32 slidably fitted in a bore 70 in the main body of housing 3. Tubular shell 32 communicates with cavity C at its base or open end. A coiled spring 12 disposed about post 34 is utilized to maintain a bias upon plate 4, the purpose for which being apparent hereinafter. Spring 12 is held in its position to so bias by means of retention between a head 34' on post 34 and a snap ring 72 mounted in an annular groove at the base of tubular shell 32. An initial biasing of plate 4 may be accomplished by adjusting a nut 37 exteriorly mounted on housing 3 but threaded to a screw head 36 integrally mounted on the head of shell 32 in bore 70. Adjustment of nut 37 slides shell 32 linearly in bore 70, thus compressing or expanding spring 12, as the case may be, and establishing a bias in one direction or the other on plate 4. An O-ring 33 is provided for shell 32, as shown in FIG. 1, thus sealing the latter against the main body of housing 3.

A diaphragm 5 and a diaphragm 10 are disposed upon the upper and lower sides, respectively, of plate 4, and are clamped in such respective positions by the tightening function of the plurality of bolts B upon the respective extreme radial areas of such diaphragms extending to the periphery of spacer ring 6.

A pilot valve mechanism 11 (FIGS. 1, 4) is disposed in the main body of housing 3 for controlling flow of fluid through device P. Mechanism 11 is threaded in an adjustable fashion into the main body of housing 3 by means of threaded portion 76 (FIG. 4) engaging corresponding threads formed in a bore 77 of such body. Bore 77 extends to cavity C on the underside of diaphragm 10. Mechanism 11 comprises a pilot valve cylindrical case 13 having a central bore 14, a piston 15 slidably slip-fitted in bore 14, and a compression spring 17 disposed in bore 14 below and engaging the lower full width or dimension 25 of piston 15. A screw 18 closes bore 14 at the bottom of mechanism 11 and retains spring 17 in its proper disposition against piston 15 in bore 14. An exhaust port 19 is also provided in screw 18 for a purpose hereinafter described.

An annular space forming a passage 78 about piston 15 is provided by means of a reduced diametrical or cylindrical portion 20 between its lower full width or dimension 25 and its upper full portion, as shown in FIG. 4. Communicating with passage 78 is one or more holes 21 drilled in pilot cylindrical case 13 and which connect with a first set of conduits 23, 24 and inlet port 22 all communicable with each other and formed in the main body of housing 3. A pressure gauge 40 is connected to such communicable passageways for indicating supply pressure in operation of device P.

Aperture means such as a milled slot 26, having its length equal to the axial length of width 25 of piston 15, is provided in pilot valve cylindrical case 13 at a point where width 25 is disposed when pressure transmitter P is in a neutral position (as shown in FIG. 1). In such neutral position, fluid flow from inlet port 22 to milled slot 26 is prevented. A plurality of suitable O-rings 31, mounted on pilot cylindrical case 13 as shown in FIG. 4, seal holes 21, passage 78 and milled slot 26 from each other as well as sealing mechanism 11 from the main body of housing 3.

A second set of air passage conduits 27, 28 and 29, communicating with each other, are provided in the main body of housing 3 for transmitting a pneumatic signal from cavity C below diaphragm 10. An outlet port 30 formed in device P communicates with passage conduit 29, while a second gauge 42 is suitably connected to such conduits for indicating a transmitted signal from device P.

Suitable means such as a washer 16 is fixedly secured to screw 35 and is movable with plate 4 as the latter moves. Washer 16 engages the top of piston 15 extending into cavity C, whereby imbalance of fluid pressures in cavity C upon diaphragms 5 and 10 causes piston 15 to react up or down accordingly. Such pressures are ultimately balanced by operation of device P, as will be more apparent in the following description concerning the operation of device P.

Operation

Port 1 is adapted to be connected to a pressure line of a system in which it is desired to measure a given pressure of fluid in such line. Inlet port 22 is connected to a source of air supply with the gauge pressure thereof readable on gauge 40. Outlet port 30 is adapted to be connected to the system at a remote point to which a pneumatic signal based on unbalanced forces is transmitted from device P. Such unbalanced forces directly reflect the variation of line pressure. If line pressure suddenly increases, a variation of pressure against diaphragm 5 is created causing plate 4, with washer 16, to react downwardly (as viewed in FIG. 1). Piston 15, constantly engaging or being biased against means 16 as a consequence of the compressive force in spring 17 of pilot valve mechanism 11, is thus forced downwardly. Width 25 of piston 17 likewise moves downwardly thereby establishing greater flow paths along conduits 23, 24, holes 21, passage 78, milled slot 26, and conduits 27, 28, 29. Consequently, pneumatic supply pressure introduced through inlet port 2 passes to outlet port 30 together with the increased pressure, or pneumatic signal, generated below diaphragm 0 and introduced into conduit 27. The increase in pressure admitted through inlet port 22 feeds back upon the outer face of diaphragm 10 with a proportionate signal until the forces acting downwardly on diaphragm 5 have been balanced by application of fluid through conduit 27 from inlet port 22. As long as pneumatic conditions remain steady or stagnant, fluid pressure through conduit 27 upon diaphragm 10 will remain constant.

Conversely, should line pressure decrease at port 1, the force on diaphragm 5 is less than that on diaphragm 10, and plate 4 moves or reacts upwardly. Piston 15 is displaced upwardly as a result of biasing spring 17. A flow path then is established between milled slot 26, bore 14 below piston 15, and exhaust port 19. Pressure is released from the underside of diaphragm 10, and air from conduits 27, 28 and 29 is bled off to atmosphere through exhaust port 19. Device P again comes into balanced condition. Thus, in application of pressure transmitter P to an automatic process control system, device P senses a pressure variable in a line of such system and transmits a corresponding or proportional signal to a remote controller or receiver commanding a control valve for rectifying the pressure in the line by varying the rate of flow through the system should an error exist therein.

The degree of pressure for effecting a pneumatic signal transmittable to a remote station in order to balance a given fluid pressure in a system in which device P is utilized, is a function of the effective area of diaphragm 10 and the amount of biasing force exerted by spring 12 against plate 4.

The effective area of diaphragm 10 is calculated as follows:

$$A = \left(\frac{a+b}{2}\right)^2 \frac{\pi}{4} \text{in.}^2$$

where A represents the effective area of diaphragm 10 in square inches, $a$ represents the diameter of diaphragm 10 at the point of contact with spacer 6, and $b$ represents the diameter of diaphragm 10 at the point of contact with plate 4. Assuming a pneumatic signal output span as 3 to 15 p.s.i., a downward force upon diaphragm 5 and reacting upon diaphragm 10 can be initially established when line pressure is zero, in order to establish an initial 3 p.s.i. starting signal. Coiled compression spring 12 is employed, therefore, for establishing a sufficient bias to create such initial 3 p.s.i. starting signal. Nut 37 is adjusted accordingly. By turning nut 37 clockwise as viewed from below FIG. 1, shell 32 is displaced further into bore 70 of housing 3, pulling down plate 4 and compressing spring 12, thus establishing a mechanical load on plate 4 equivalent to a 3 p.s.i. starting signal on diaphragm 10. Thereafter, pilot valve cylindrical case 13 is adjusted so that piston 15 engages washer 16 and width 25 of piston 15 lies across and coincident with milled slot 26 in pilot valve cylindrical case 13. This procedure may be repeated until no further adjustments are required, thereby calibrating pressure transmitter P.

Diaphragm 10 is preferably made of a relatively stiff metal such as hardened Phosphor bronze. Whenever pilot valve cylindrical case 13 is turned clockwise, piston 15 is raised thereby moving plate 4 up, by reason of engagement of washer 16 with piston 15. Diaphragm 10 thus lifts off from the outer circumference of plate 4 in addition to a greater initial signal being established by further compression of spring 12. A reduction occurs in diameter $b$, as shown in FIG. 3. By the above equation, a reduction in diameter $b$ leads to a reduction in effective area A. If the effective area of diaphragm 10 is reduced, assuming no further adjustment in the compression of spring 12 is to be made, increased air pressure from inlet port 22 along flow path 23, 24 and holes 21 is required to balance the same fluid pressure flowing through port 1 and against diaphragm 5. The rotation of pilot valve cylindrical case 13, therefore, varies and measures the range of fluid pressure in the line of the system to which device P is connected to the span of the pneumatic signal output of device P. For example, in one position for pilot valve mechanism 11, a 3–15 p.s.i. span in the signal output flow path of 27, 28, 29 and outlet port 30 can cover a 0–100 p.s.i. fluid pressure in the line, while in another position of pilot valve mechanism 11, reflecting a different effective area A for diaphragm 10, and with identical parts of construction, the same pressure transmitter device P can measure a fluid pressure in the line of 0–200 p.s.i.

The rotation of pilot valve mechanism 11 may be monitored by inclusion of a suitable means such as dial 38 for measuring variable fluid pressure ranges in the same device P.

A modified embodiment of the invention is illustrated in FIG. 3 and is more suitable in the case of higher pressures utilized in an automatic process control system. A flexible metal bellows 7 is employed in substitution for diaphragm 5. Bellows 7 is welded to a retainer cap 8 fastened to a flanged cap member 9 by a suitable threaded connection.

Even though the invention has been disclosed in connection with a specific embodiment of the same, it will be understood that this is intended by way of illustration only and that numerous changes can be made in the construction and arrangement of parts without departing from the spirit of the invention or the scope of the appended claims. For instance, an adjustable conventional bleed nozzle cooperating with washer 16 acting as a flapper could replace pilot valve mechanism 11, although the use of the 3-way pilot valve mechanism 11 is preferred for reasons outlined above. It also should be understood that by using the pressure of a temperature sensitive liquid at, or a vapor expanding from, a remote bulb, the present device may be used as a temperature transmitter converting the temperature at such remote bulb location into a proportional air signal.

Having thus clearly shown and described the invention, what is claimed as new and desired to secure by Letters Patent is:

1. A pressure transmitting device for establishing a transmittable signal proportional to variation in fluid pressure in a system, comprising in combination,
    a cavity formed in a housing having a port adapted to be connected to a line in a fluid flow system,
    a movable plate disposed in said cavity,
    a pair of diaphragms each mounted on a side of said plate and sealing their respective portions of said cavity whereby the first diaphragm only is exposed to said port and the outer face of the second diaphragm is sealed from said plate and first diaphragm,
    means fixedly secured to said plate in the sealed portion of said cavity facing the outer face of the second diaphragm,
    a first set of conduits and an inlet port thereto in said housing,
    a second set of conduits and an outlet port thereto in said housing,
    a 3-way valve mechanism mounted in said housing off-center of said plate and comprising
        (a) a cylindrical case,
        (b) a slip-fit piston slidable in said case and having its one end biased against said fixedly secured means for movement of said piston with said plate,
        (c) means for connecting together said first set and second set of conduits in said housing, and
        (d) an exhaust port,
    said second set of conduits connecting the sealed portion of said cavity facing the outer face of the second diaphragm to said outlet port and to said 3-way valve mechanism,
    said piston responding in movement with said plate to an imbalance upon said diaphragms when line pressure variation occurs,
    a pneumatic signal being established by such imbalance and transmittable through said outlet port to a remote receiver,
    said 3-way valve mechanism being adjustable in said housing,
    said piston being positioned by said plate through engagement with said means fixedly secured to said plate,
    the effective area of said second diaphragm changing by movement of said plate,
    whereby variable fluid pressure ranges to the same pneumatic signal output span are measurable.

2. The device of claim 1 including mechanical biasing means for said plate whereby an initial pneumatic signal is imposed upon said second diaphragm.

3. The device of claim 2 in which said mechanical biasing means is centrally aligned of said plate and comprises in combination
    a biasing spring retained in a slidable tubular shell disposed in a bore of a base of said housing, said spring adapted to exert a force against said plate, and
    means for adjusting the position of said tubular shell in said bore whereby the force of said spring against said plate is made variable.

4. A pressure transmitting device for establishing a transmittable signal proportional to variation in fluid pressure in a system, comprising in combination,
    a cavity formed in a housing having a port adapted to be connected to a line in a fluid flow system,
    a movable plate disposed in said cavity,
    a bellows in said cavity and being fastened to said housing and securely mounted to said plate on its upper side,
    said port in said housing communicating with said bellows, a diaphragm mounted on the lower side of said plate whereby the outer face of the diaphragm is sealed from said plate and bellows,
    means fixedly secured to said plate in the sealed portion of said cavity facing the outer face of the diaphragm,
    a first set of conduits and an inlet port thereto in said housing,
    a second set of conduits and an outlet port thereto in said housing,
    a 3-way valve mechanism mounted in said housing off-center of said plate and comprising
        (a) a cylindrical case,
        (b) a slip-fit piston slidable in said case and having its one end biased against said fixedly secured means for movement of said piston with said plate,
        (c) means for connecting together said first set and second set of conduits in said housing, and
        (d) an exhaust port,
    said piston responding in movement with said plate to an imbalance upon said bellows and diaphragm when line pressure variation occurs,
    a pneumatic signal being established by such imbalance and transmittable through said outlet port to a remote receiver,
    said 3-way valve mechanism being adjustable in position in said housing,
    said piston being positioned by said plate through engagement with said means fixedly secured to said plate,
    the effective area of said diaphragm changing by movement of said plate,
    whereby variable fluid pressure ranges to the same pneumatic signal output span are measurable.

5. The device of claim 4 including mechanical biasing means for said plate whereby an initial pneumatic signal is imposed upon said diaphragm.

6. The device of claim 5 in which said mechanical biasing means is centrally aligned of said plate and comprises in combination
    a biasing spring retained in a slidable tubular shell disposed in a bore of a base of said housing, said spring adapted to exert a force against said plate, and means for adjusting the position of said tubular shell in said bore whereby the force of said spring against said plate is made variable.

References Cited

UNITED STATES PATENTS

| | | | |
|---|---|---|---|
| 2,379,483 | 7/1945 | Hapgood | 137—625.66 |
| 3,252,471 | 5/1966 | Olson | 137—85 |
| 2,645,240 | 5/1953 | Drake. | |
| 3,165,262 | 1/1965 | Ollivier | 137—85 |

LOUIS R. PRINCE, Primary Examiner

D. E. CORR, Assistant Examiner

U.S. Cl. X.R.

73—410; 137—85